(12) United States Patent
Le Gars

(10) Patent No.: US 7,471,191 B2
(45) Date of Patent: *Dec. 30, 2008

(54) AUTOMATIC CYCLE STORAGE SYSTEM

(75) Inventor: Jacques Le Gars, Gambais (FR)

(73) Assignee: J. C. Decaux SA, Neuilly sur Seine (FR)

( * ) Notice: Subject to any disclaimer, the term of this patent is extended or adjusted under 35 U.S.C. 154(b) by 131 days.

This patent is subject to a terminal disclaimer.

(21) Appl. No.: 10/583,073

(22) PCT Filed: Nov. 29, 2004

(86) PCT No.: PCT/FR2004/003056

§ 371 (c)(1),
(2), (4) Date: Jun. 15, 2006

(87) PCT Pub. No.: WO2005/068280

PCT Pub. Date: Jul. 28, 2005

(65) Prior Publication Data

US 2008/0042811 A1 Feb. 21, 2008

(30) Foreign Application Priority Data

Dec. 16, 2003 (FR) .................................. 03 14774

(51) Int. Cl.
*B62J 3/00* (2006.01)
*E05B 53/00* (2006.01)
*G07D 7/00* (2006.01)

(52) U.S. Cl. ................... 340/432; 340/427; 340/542; 340/568.2; 194/202; 70/233; 70/263

(58) Field of Classification Search ................... 340/432
See application file for complete search history.

(56) References Cited

U.S. PATENT DOCUMENTS

| 5,760,681 | A | * | 6/1998 | Varis et al. ................... 340/432 |
| 5,815,069 | A | * | 9/1998 | Horton ........................ 340/427 |
| 5,841,351 | A | | 11/1998 | Rey |
| 2002/0174077 | A1 | * | 11/2002 | Yui et al. ..................... 705/400 |

FOREIGN PATENT DOCUMENTS

EP 0 594 954 5/1994

(Continued)

OTHER PUBLICATIONS

French Preliminary Search Report Dated Jul. 23, 2004, Appl. No. FR 0 314 774.

(Continued)

*Primary Examiner*—Donnie L Crosland
(74) *Attorney, Agent, or Firm*—McCracken & Frank LLP

(57) ABSTRACT

An automatic cycle storage system comprising cycles, each of which carries a blocking device and an electronic circuit; a cycle storage area serving to receive the cycles while they are not being used; and a control device adapted to authorize, selectively, cycles to be borrowed from the storage area. The control device and the cycle are each provided with a respective short-range wireless communications interface, and the cycle includes an electrical lock device adapted to lock the blocking device in the blocking position.

7 Claims, 5 Drawing Sheets

FOREIGN PATENT DOCUMENTS

| | | |
|---|---|---|
| EP | 0 875 867 | 11/1998 |
| EP | 1 281 588 | 2/2003 |
| FR | 2 824942 | 11/2002 |
| FR | 2 837 460 | 9/2003 |
| WO | WO 01/54080 | 7/2001 |
| WO | WO 03/071493 | 8/2003 |

OTHER PUBLICATIONS

International Search Report dated Mar. 3, 2005 for Appl. No. PCT/FR2004/003056.

Translation of International Preliminary Report on Patentability, Appl. No. PCT/FR2004/003056, Nov. 2006.

* cited by examiner

AUTOMATIC CYCLE STORAGE SYSTEM

FIELD OF INVENTION

The present invention relates to automatic cycle storage systems serving, in particular to make cycles available temporarily to the public.

BACKGROUND OF THE INVENTION

More particularly, the invention relates to an automatic cycle storage system comprising:
- a plurality of cycles (e.g. bicycles), each of which carries a blocking device and an electronic circuit;
- at least one cycle storage area serving to receive the cycles while they are not being used; and
- at least one control device adapted to authorize, selectively, cycles to be borrowed from the storage area.

Such a cycle storage system can be used, for example to make cycles available to the public, subject to the person who is borrowing the cycle being identified, and optionally subject to a rental being paid at a control terminal post.

Document EP-A-0 875 867 describes an example of such a cycle storage system in which the cycles are locked by means of their blocking devices co-operating with stationary lock stations disposed on the public thoroughfare.

Unfortunately, that known cycle storage system suffers from the drawback of cluttering up the public thoroughfare with its cycle storage stations. That drawback becomes prohibitive if it is to desired to be able to store a large number of cycles in the same storage area, since the amount of space required by the system then becomes very large (see, for example, FIG. 2 in the above-mentioned document).

OBJECTS OF THE INVENTION

A particular object of the invention is to mitigate that drawback.

To this end, according to the invention, a cycle storage system of the type in question is characterized in that the blocking device of each cycle is mounted to move between firstly a blocking position in which the blocking device blocks at least one moving member of the cycle so as to prevent the cycle from being used normally, and secondly a releasing position in which the blocking device does not interfere with said moving member and makes it possible for the cycle to be used normally;

in that the control device is provided with a first short-range wireless communications interface having range limited substantially to the storage area;

in that each cycle is provided with second short-range wireless communications means adapted to communicate with the first communications interface, said second communications interface being connected to the electronic circuit of the cycle;

in that the cycle includes an electrical lock device controlled by the electronic circuit of the cycle and adapted to lock the blocking device in the blocking position;

and in that the control device is adapted to control the blocking device of each cycle via the first communications interface and via the second communications interface of said cycle.

By means of these provisions, it is possible to store a large number of cycles in the storage area, that number being limited only by the range of the first and second communications interfaces, and the amount of space occupied by the system on the public thoroughfare is minimized because it is no longer necessary to use stationary lock stations such as posts or the like.

In addition, the cycle storage area remains well identified (by road markings or by some other form of signaling, or indeed by the presence of a rental terminal post making it possible to borrow the cycles), so that users know where to find cycles to be borrowed. Finally, users return their cycles to the storage areas when they have finished using them, and said storage areas can be chosen and/or fitted out and/or lit so as to avoid or so as to limit theft of stored cycles.

In various embodiments of the invention, it is optionally possible also to use one or more of the following provisions:
- each cycle has a frame which carries handlebars connected via a fork to a front wheel, and the blocking device comprises a bracket mounted to pivot on the frame, said bracket being provided with a U-shaped recess and being adapted to come to engage over the fork of the cycle, thereby blocking said fork, when the blocking device is in the blocking position;
- the control device includes interfaces adapted to enable a user to cause a cycle stored in the storage area to be unlocked;
- the system further comprises a server adapted to communicate with a radiotelephone belonging to a user, said server communicating with the control device and being adapted to cause a cycle in the storage area to be unlocked by said control device as a function of information received by the radiotelephone of the user;
- each cycle is provided with indicator means adapted to indicate that the electrical lock device is unlocked;
- the first and second communications interfaces are adapted to communicate with each other by radio;
- the first and second communications interfaces are adapted to communicate with each other using a short-range radio-communications protocol chosen from the Bluetooth, Wireless Fidelity (WiFi), and Digitally Enhanced Cordless Telephony (DECT) protocols.

BRIEF DESCRIPTION OF THE DRAWINGS

Other characteristics and advantages of the invention appear from the following description of two embodiments thereof, given by way of non-limiting example, and with reference to the accompanying drawings.

In the drawings.

MORE DETAILED DESCRIPTION

In the various figures, like references designate elements that are identical or similar.

Figure 1:
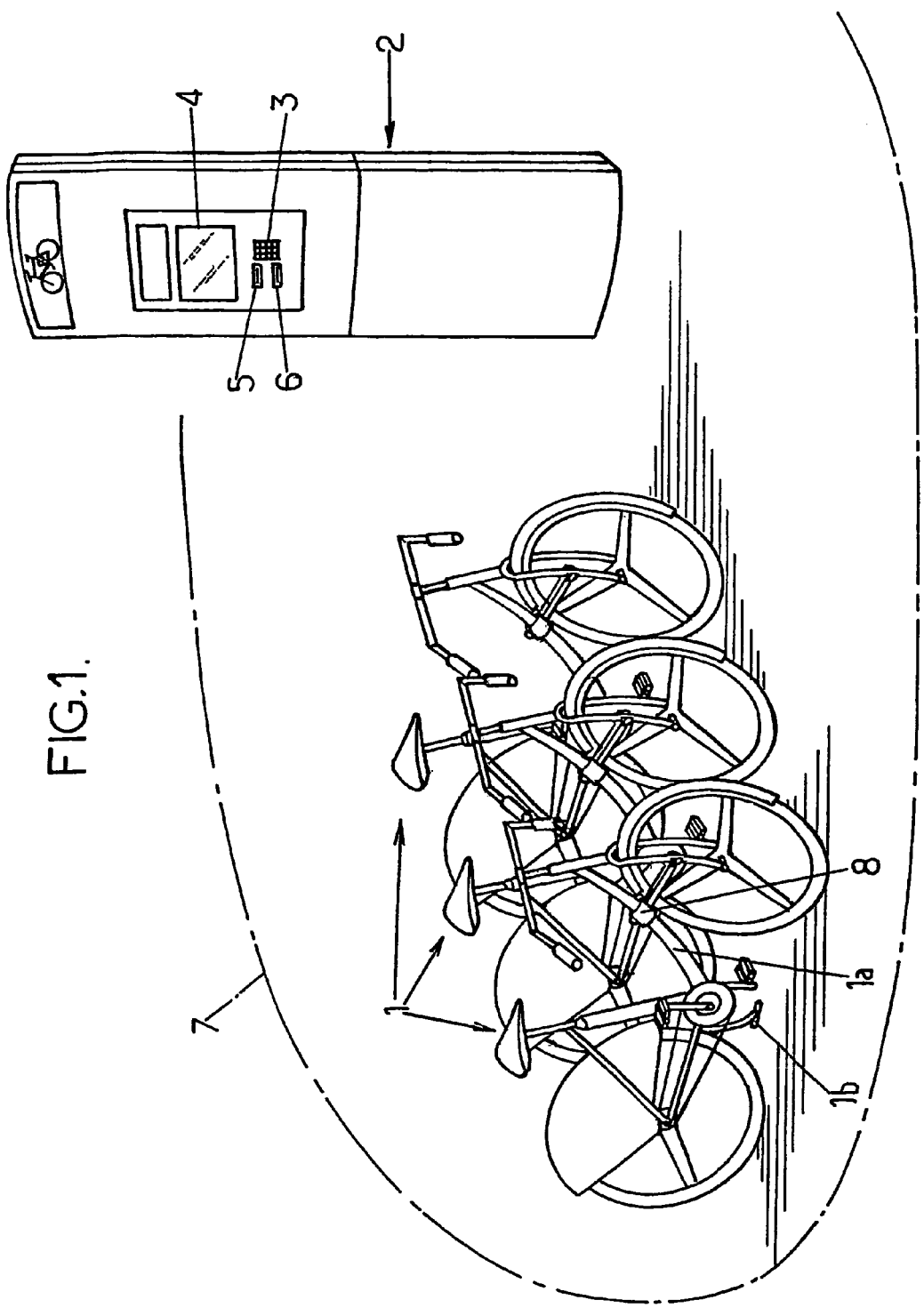
FIG. 1 is a diagrammatic perspective view showing an embodiment of an automatic cycle storage system of the invention.

As shown in FIG. 1, the present invention relates to a system for automatically storing cycles 1 such as, in particular, bicycles, making it possible, for example, to store the cycles on a public thoroughfare so as to make them available to the public.

The automatic cycle storage system also includes a control device such as an interactive terminal post 2 provided with a user interface comprising, for example, a keypad 3, a screen 4, an electronic card reader 5 for reading handheld electronic cards, and optionally a ticket-issuing device 6 serving, for example, to confirm a payment or an authorization to debit a payment card account, or the like.

A cycle storage area 7, optionally defined by signaling such as road markings, extends in the vicinity of the interactive terminal post 2 for the purpose of receiving cycles 1 while they are not being used.

Figure 2:
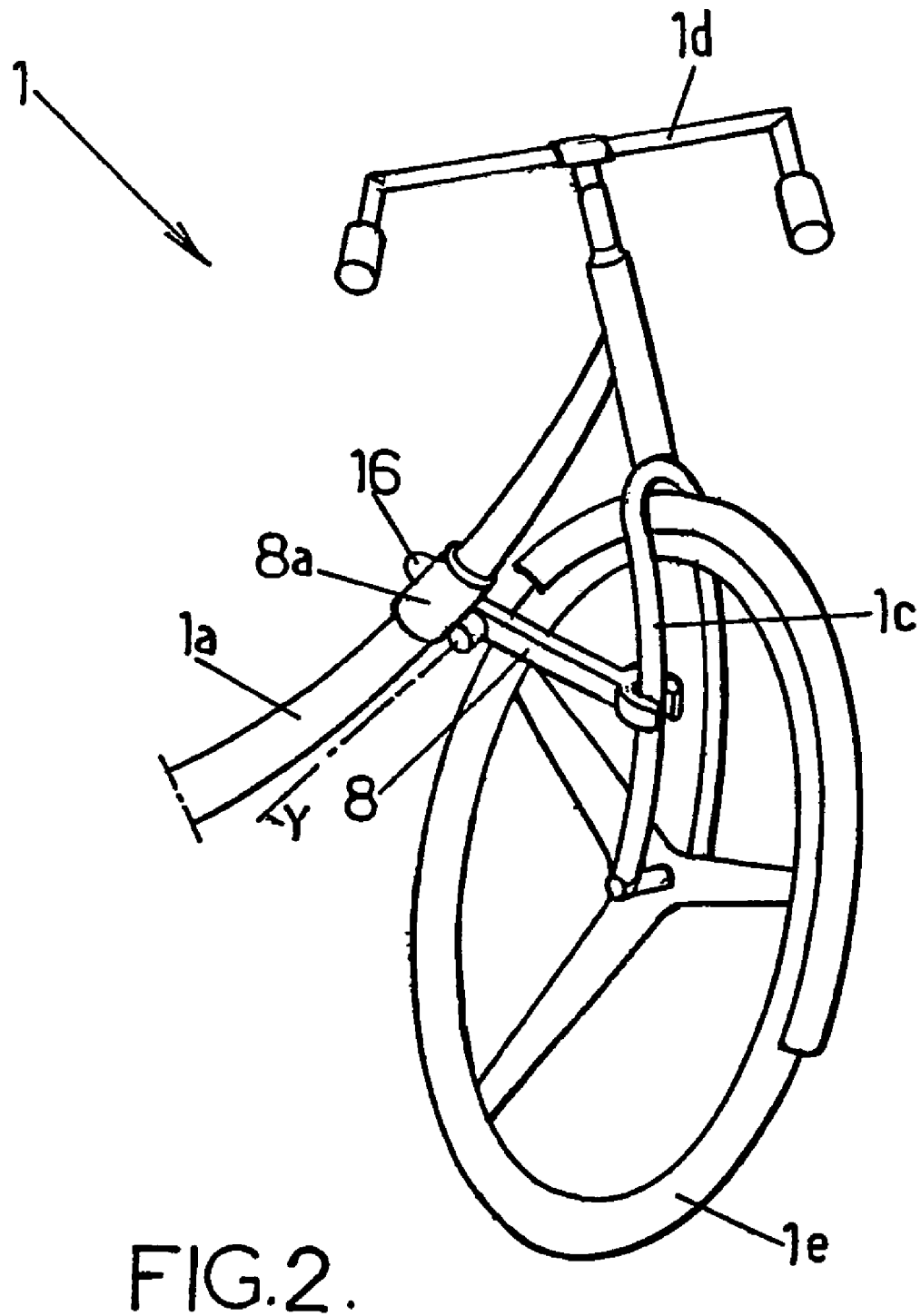
FIG. 2 is a detail view showing how a cycle is locked to one of the locking stations of FIG. 1.

When they are returned to the storage areas 7, each of the cycles 1 preferably stands on a kickstand 1b pivotally mounted on its frame 1a. In addition, as shown in FIG. 2, each cycle is provided with a blocking device 8 which can, for example, be mounted on a collar 8a or on some other support rigidly fastened to the frame 1a of each cycle. This blocking device can, for example, be in the form of a bracket provided with a U-shaped recess that is adapted to come, when the front wheel is turned through 90°, to engage over the fork 1c which connects the handlebars 1d to the front wheel 1e. In this blocking position, the blocking device prevents any movement of the front wheel 1e and thus prevents normal use of the cycle. The blocking device 8 can, in addition, be blocked in this blocking position by an electrical lock device (not shown in FIG. 1), so that the blocking device 8 then serves as an antitheft bicycle lock while the cycle is being stored in the storing area 7.

Figure 3:
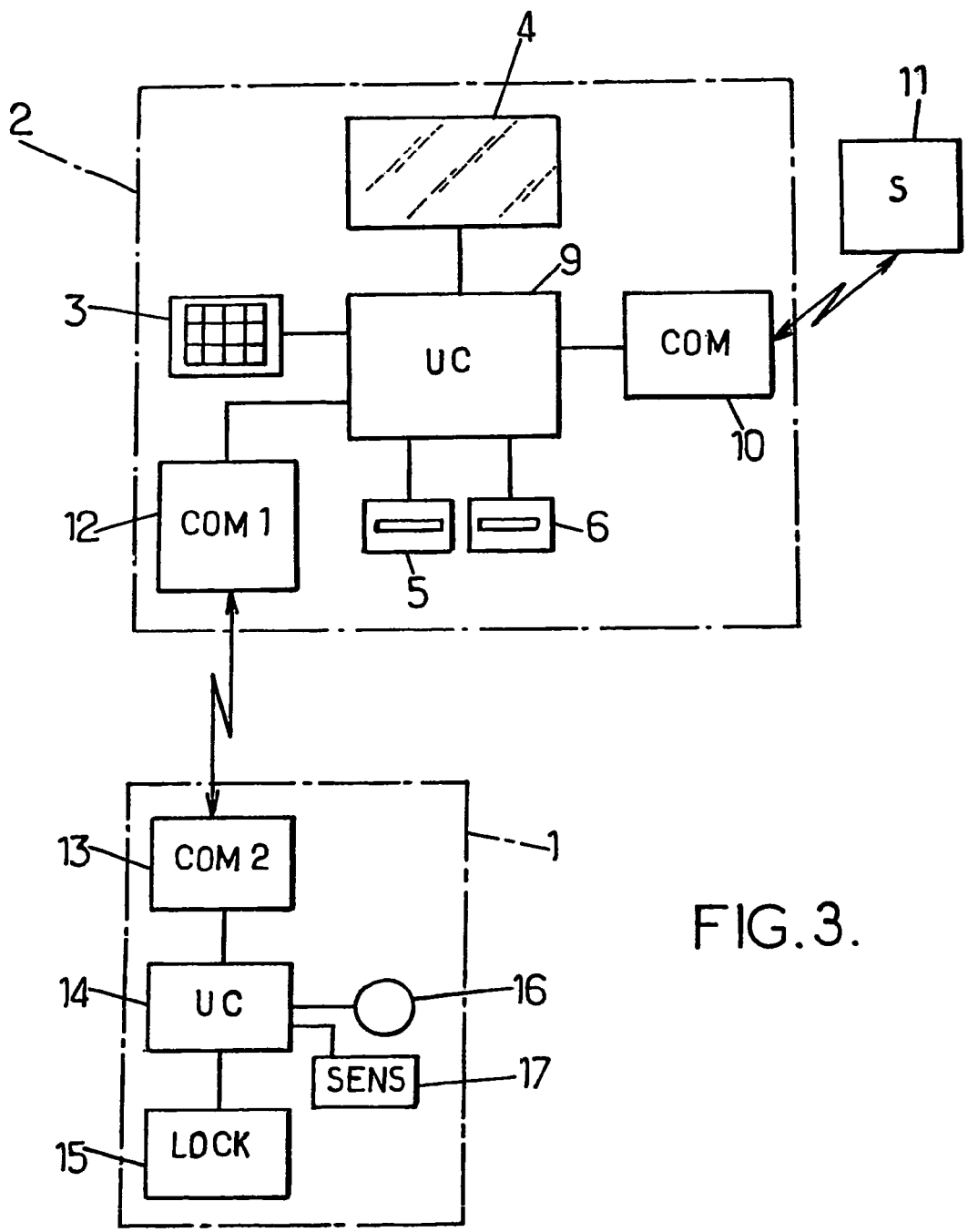
FIG. 3 is a block diagram of the cycle storage system of FIG. 1.

As shown in FIG. 3, the interactive terminal post 2 can be include an electronic central processing unit (CPU) 9 (UC) such as a microprocessor of the like that communicates with the keypad 3, the screen 4, the card reader 5 and the ticket-issuing device 6. The CPU 9 also communicates with a communications interface 10 (COM) which can itself communicate with a central server 11 (S), e.g. by radio or by some other means.

Finally, the CPU 9 of the interactive terminal post 2 is connected to a short-range wireless communications interface 12 (COM1) having range limited substantially to the storage area 7, and, for example, generally shorter than 50 meters (m), and advantageously about 10 m.

This communications interface 12 is adapted to communicate remotely with a similar communications interface 13 (COM2) belonging to each cycle. The two communications interfaces 12, 13 can advantageously be interfaces communicating by radio, advantageously using a short-range radio-communications protocol chosen from among the Bluetooth, WiFi, and DECT protocols.

Optionally, the shape of the area of coverage of the interface 12 can be adapted to match the configuration of the site, by the choice and/or the angular positioning of the antenna of said interface 12.

Each cycle 1 is further provided with an electronic circuit such as a CPU 14 (UC) that can, in particular, be a microprocessor, said electronic circuit 14 being connected to the communications interface 13, to the above-mentioned electrical lock device 15 (LOCK), and advantageously to an indicator device 16 such as a light-emitting diode (LED) and to a sensor 17 (SENS) adapted to detect the blocking position of the blocking device 8.

The electrical lock device 15 can, for example, consist of a stepper motor adapted to move a locking member between locked and unlocked positions allowing or not allowing the moving bracket of the blocking device 8 to pivot.

The sensor 17 can consist merely of an electrical contact that closes when the pivotally mounted bracket of the blocking device 8 is in the blocking position.

The above-described device operates as follows.

When a user wishes to borrow a cycle 1 that is present in the storage area 7, said user can, for example, insert an electronic payment card into the reader 5 of the interactive terminal post 2, and then input a secret code by means of the keypad 3.

The terminal post 2 then communicates with the server 11 to obtain the authorization to release a cycle 1 present in the storage area 7. All the cycles 1 present in the storage area 7 can be identified by the interactive terminal post 2 because said cycles 1 communicate with said interactive terminal post via communications interfaces 12, 13.

The authorization to release a bike is given, for example, as a function of the validity of a subscription of the user, or optionally as a function of a call between the interactive terminal 2 and/or between the server 11 and an electronic money server (not shown).

When the interactive terminal post 2 receives the authorization to release a cycle 1, it sends an order by radio to one of the cycles 1 in the storage areas 7, so that the electronic circuit 14 of that cycle causes the electrical lock device 15 to move to its unlocked position. At the same time, the interactive terminal post 2 can also send a user identity code or a transaction identity code to the cycle 1 in question, and the electronic circuit of said cycle stores said code in a memory.

The electronic circuit 14 of the cycle then causes its light-emitting diode 16 to flash so that the user can identify the cycle that is unlocked. The user can then lift away the pivotally mounted bracket of the blocking device 8 so as to release the handlebars 1d of the cycle, and is then free to use the cycle.

Subsequently, when the user wishes to return the cycle borrowed from a storage area 7 (which can be the storage area from which the cycle was borrowed, or some other similar storage area), it suffices for said user to return the cycle to the desired storage area, to put down the kickstand 1b, to turn the handlebars through 90°, and to lower the bracket of the blocking device 8 of the cycle. The interactive terminal post 2 which corresponds to said storage area 7 and which establishes communication with the cycle 1 by radio as soon as the cycle penetrates into the storage areas 7 then sends a locking order to the cycle 1.

The electronic circuit 14 of the cycle then verifies, by means of the sensor 17, that the blocking device 8 is properly in the blocking position, and, if it is, actuates the electrical lock device 15 so that the blocking device 8 is then locked in the blocking position. The electronic circuit 14 of the cycle then sends back an acknowledgement message to the interactive terminal post 2 which is thus informed that the cycle 1 has been locked properly. At the same time, the electronic circuit 14 can send to the interactive terminal post 2 the user or transaction identity code stored when the cycle is borrowed, so that the terminal post 2 and/or the server 11 can determine which cycle loan has ended (which makes it possible, for example, to ensure that a user does not keep a cycle for too long, or optionally to invoice the cycle loan as a function of its length of time).

Figure 4:
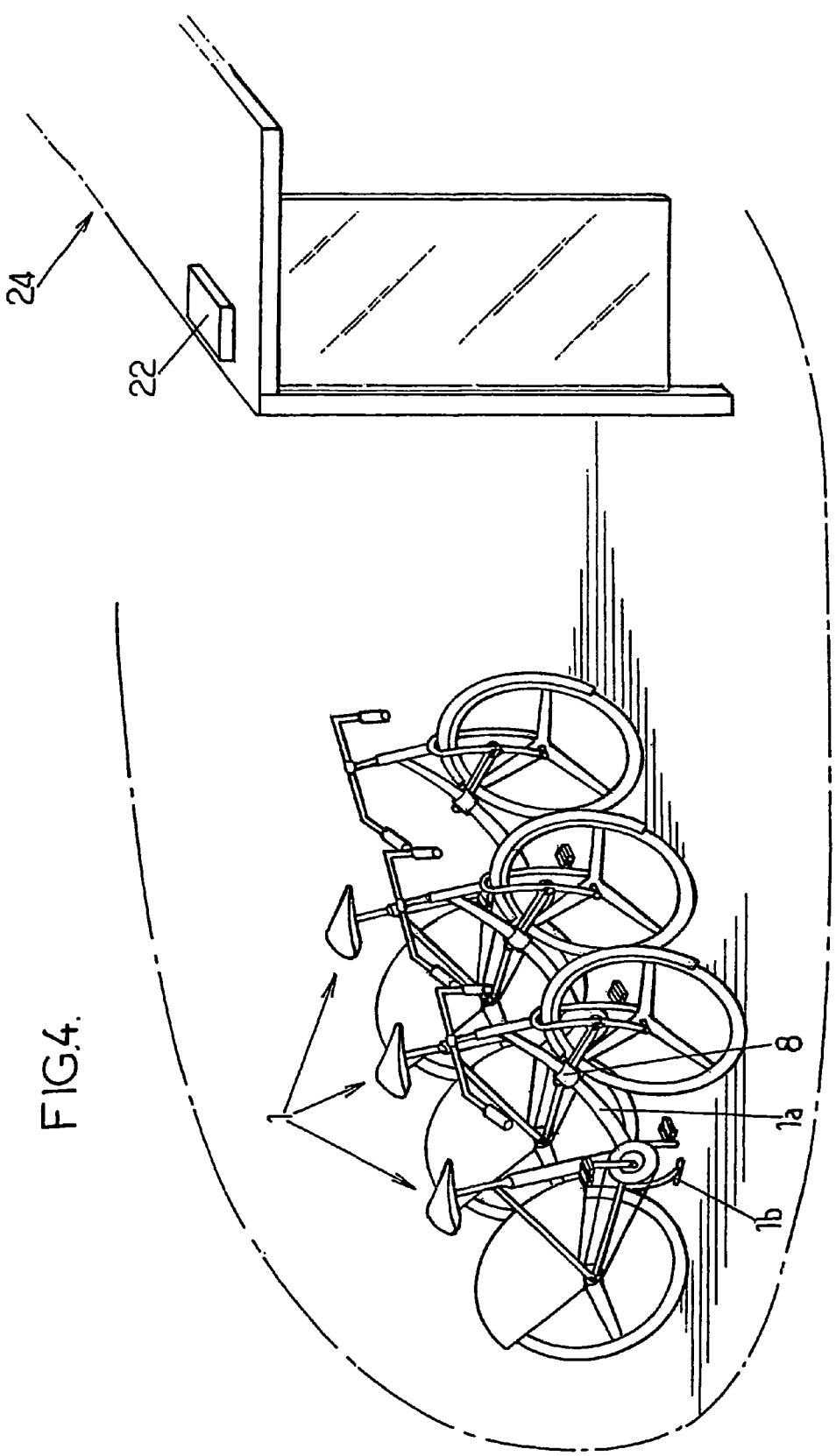
FIG. 4 is a view similar to FIG. 1 in a second embodiment of the invention.
Figure 5:
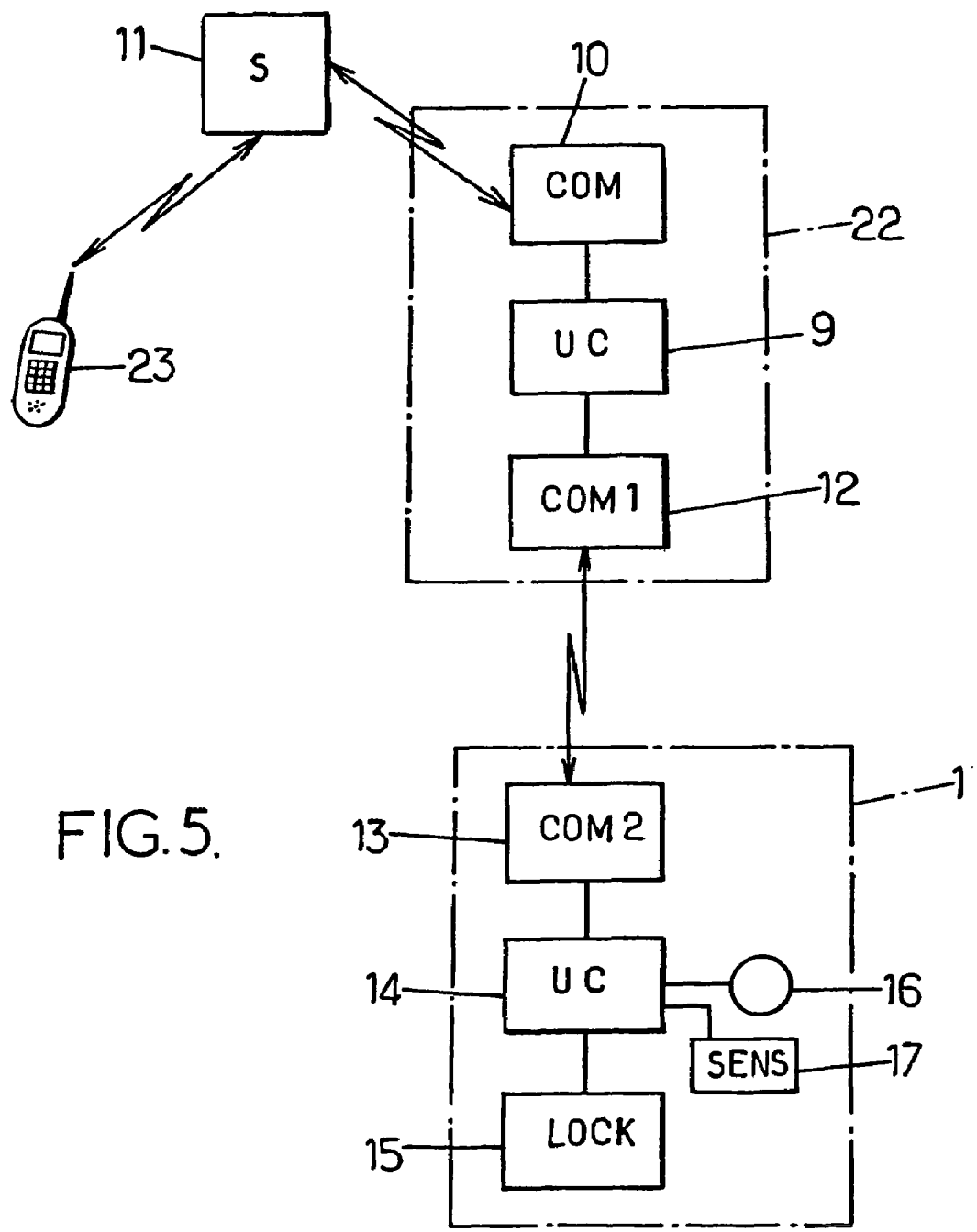
FIG. 5 is a block diagram showing how the system of FIG. 4 operates.

In the second embodiment of the invention, shown in FIGS. 4 and 5, the cycles 1 are identical to the cycles described above, but the interactive terminal post 2 is omitted, and it is replaced with a control device 22 that comprises only the CPU 9 and the communications interfaces 10, 12.

In this second embodiment, the control device 22 can be of small size, and be received, for example, in a piece of street furniture 24 such as a bus shelter under which people can wait for buses, or some other piece of street furniture.

In addition, in this embodiment, users who wish to borrow cycles 1 communicate directly with the server 11 or optionally with the control device 22, via their mobile phones or "cellphones" 23 which enable them to be identified by the server 11 and/or by the control device 22, and optionally to make a payment or authorize a debit from a bank card or credit card account.

In the second embodiment, the automatic cycle storage system operates in the same way as the above-described system operates once that the system has issued an authorization to borrow a cycle.

The invention claimed is:

1. An automatic cycle storage system comprising:
a plurality of cycles, each of which carries a blocking device and an electronic circuit;
at least one cycle storage area serving to receive the cycles while they are not being used; and
at least one control device adapted to authorize, selectively, cycles to be borrowed from the storage area;
wherein the blocking device of each cycle is mounted to move between firstly a blocking position in which the blocking device blocks at least one moving member of the cycle so as to prevent the cycle from being used normally, and secondly a releasing position in which the blocking device does not interfere with said moving member and makes it possible for the cycle to be used normally;
wherein the control device is provided with a first short-range wireless communications interface, said first communications interface being stationary and having range limited substantially to the storage area;
wherein each cycle is provided with a second short-range wireless communications interface adapted to communicate with the first communications interface, said second communications interface being connected to the electronic circuit of the cycle;
wherein the cycle includes an electrical lock device controlled by the electronic circuit of the cycle and adapted to lock the blocking device in the blocking position;
wherein the control device is adapted to control the blocking device of each cycle via the first communications interface and via the second communications interface of said cycle.

2. A system according to claim 1, in which each cycle has a frame which carries handlebars connected via a fork to a front wheel, and the blocking device comprises a bracket mounted to pivot on the frame, said bracket being provided with a U-shaped recess and being adapted to come to engage over the fork of the cycle, thereby blocking said fork, when the blocking device is in the blocking position.

3. A system according to claim 1, in which the control device includes interfaces adapted to enable a user to cause a cycle stored in the storage area to be unlocked.

4. A system according to claim 1, further comprising a server adapted to communicate with a radiotelephone belonging to a user, said server communicating with the control device and being adapted to cause a cycle in the storage area to be unlocked by said control device as a function of information received by the radiotelephone of the user.

5. A system according to claim 1, in which each cycle is provided with indicator means adapted to indicate that the electrical lock device is unlocked.

6. A system according to claim 1, in which the first and second communications interfaces are adapted to communicate with each other by radio.

7. A system according to claim 6, in which the first and second communications interfaces are adapted to communicate with each other using a short-range radio-communications protocol chosen from the Bluetooth, WiFi, and DECT protocols.

* * * * *